United States Patent [19]

Moffat

[11] Patent Number: 4,521,894
[45] Date of Patent: Jun. 4, 1985

[54] OVERSPEED/UNDERSPEED DETECTOR

[75] Inventor: Richard P. Moffat, Regina, Canada

[73] Assignee: Saskatchewan Power Corporation, Saskatchewan, Canada

[21] Appl. No.: 371,019

[22] Filed: Apr. 22, 1982

[51] Int. Cl.³ .................. G05B 11/06; G05D 13/62
[52] U.S. Cl. .................................... 377/16; 377/39; 318/314
[58] Field of Search .............. 377/2, 39, 16; 318/723, 318/314, 313; 307/271

[56] References Cited

U.S. PATENT DOCUMENTS

| | | | |
|---|---|---|---|
| 3,422,619 | 12/1969 | Hendricks | 60/39.281 |
| 3,943,452 | 3/1976 | Zitelli | 307/271 |
| 4,105,935 | 8/1978 | Arai et al. | 318/314 |
| 4,155,033 | 5/1979 | DeBell et al. | 318/314 |
| 4,160,939 | 7/1979 | Damouth et al. | 318/723 |
| 4,169,992 | 10/1979 | Nash | 322/39 |
| 4,218,879 | 8/1980 | Hagrman et al. | 60/39.281 |
| 4,263,583 | 4/1981 | Wyckoff | 377/16 |
| 4,365,202 | 12/1982 | Sinniger | 377/39 |

Primary Examiner—John S. Heyman
Attorney, Agent, or Firm—Murray, Whisenhunt & Ferguson

[57] ABSTRACT

A digital system for monitoring the rotational speed of a rotating body, such as a turbine shaft, in order to indicate an overspeed or underspeed condition, features a readily variable reference speed limit. A reference pulse train is generated. The number of pulses from the reference pulse train is counted for a predetermined period of time proportional to a fixed number of rotations of the rotating body, and the resulting count is compared to a fixed reference count. The reference speed limit is adjusted by variation of the frequency of the reference pulse train.

12 Claims, 5 Drawing Figures

OVERSPEED/UNDERSPEED DETECTOR

The present invention relates to a system for monitoring the rotational speed of a rotating body, such as a turbine shaft, in order to indicate an overspeed or underspeed condition, and more particularly to an electronic, digital system for indicating an overspeed or underspeed condition of a rotating body.

BACKGROUND OF THE INVENTION

In rotating machines, and particularly in large rotating systems such as industrial turbines or compressors, reliable protection of the system against overspeed or underspeed is required. The term "overspeed" describes the situation which occurs if the rotating parts of a machine or the like have a rotational speed exceeding a predetermined maximum value. The term "underspeed" refers to the converse situation. An uncorrected overspeed or underspeed condition may result in major damage to equipment and danger to human safety. Either overspeed or underspeed condition may result from instantaneous loss of full load or power, and reliable reaction time of the overspeed/underspeed detector is essential. To prevent damage to the monitored machine, the overspeed/underspeed detector generally initiates a shutdown sequence once an unacceptable speed has been monitored over a prescribed interval.

Existing overspeed/underspeed detection systems can be categorized generally as (1) analogue, (2) digital or (3) combined analogue and digital. Generally, such systems consist of a speed transducer, driven by a rotating shaft of the monitored machine, which transducer produces an output signal whose amplitude or frequency is proportional to the machine's angular velocity; a reference signal generating circuit whose output signal has an amplitude or frequency proportional to the maximum or minimum speed limit; and a comparator circuit which compares the output signal of the transducer with the reference signal to produce a third signal indicative of whether or not a machine is running within acceptable limits. Generally, either the frequency of the transducer signal is compared to a reference frequency proportional to the prescribed speed limit, a number of pulses produced by the transducer over a fixed period of time is compared to a reference number, or the transducer pulse train is applied against a reference pulse train of known characteristics in order to produce a third pulse train indicative of the differential. Existing analogue systems are simple in design but have proved to suffer from inaccuracy due to noise and temperature or aging drift. Combined digital/analogue systems generally require complex circuitry and increased cost. Digital systems are often too slow in response time. Where response time has been improved by monitoring the period of the measured signal rather than the frequency, it has been found to be difficult to vary the reference speed limit particularly where an accessory shaft, rather than the main shaft of the machine, is being monitored.

For example, an existing analogue overspeed/underspeed detector is a direct current tachogenerator which generates a signal whose amplitude is proportional to the angular velocity of the shaft whose speed is being measured. This amplitude may then be compared to a reference level to determine under or overspeed. Noise in the circuit, attenuation during transmission, and variations due to temperature and time render this method inaccurate and necessitate complex compensating circuitry. An alternating current tachogenerator may be used to generate a signal whose frequency is proportional to the measured frequency. This frequency-defined signal may be converted to a voltage-defined signal whose amplitude is then compared to a reference signal. Conversely, an amplitude-defined transducer signal may be connected to a frequency-defined comparison signal. These methods suffer from the same problems associated with other analogue methods.

In another existing overspeed detection method, the phase difference between the source frequency and the reference frequency is used to produce a third signal indicative of the deviation in angular velocity from the desired rate. Alternatively, a signal whose pulse width is proportional to the period of the transducer signal may be compared to a reference pulse train whose pulse width is inversely proportional to the reference speed to obtain a third pulse train whose magnitude and polarity indicate the extent of over or underspeed. These methods require overly complex circuitry to generate the relevant pulse trains, which are not readily variable with regard to reference speed. A similar method, suffering from the same drawback, uses a ramp generator which is enabled for a period of time proportional to the time taken for a monitored machine to complete a fixed number of revolutions, producing a sawtooth wave form whose peak amplitude is proportional to such period. The sawtooth wave form is then applied to a comparator whose resulting square wave is analyzed to indicate the differential from the desired speed.

Existing digital overspeed/underspeed detectors utilize the method of counting the number of pulses generated by the speed transducer for a fixed period of time, comparing this count to a reference count representative of the upper or lower speed limit. A problem with this method is that the counting period must be of sufficient length that the margin of error is within acceptable limits. Where the speed sensor measures a slow accessory shaft or the monitored machine itself is low speed, the time period required to accumulate a sufficient count may delay the output of a control signal beyond reasonable limits.

An alternative digital method is to generate a digital count representative of the period of rotation of the machine, and to convert such count to a voltage or frequency which is then compared to the desired level or is used to control the speed. This latter step requires analogue circuitry with the accompanying disadvantages previously described, and the reference speed limit is not readily adjustable.

SUMMARY OF THE INVENTION

The present invention provides a simple, accurate and cost-effective system for indicating overspeed or underspeed of a rotating part wherein the reference speed limit is readily adjustable. A variable frequency generator, which may utilize convenient thumbwheel switches, is used to produce a reference pulse train whose pulse repetition rate is proportional to the prescribed over or underspeed limit. A counter, such as a divide-by-N down counter, is utilized to count the number of reference pulses generated over a count time determined by a fixed number of rotations of the shaft or other part whose speed is being monitored. By comparing the count to a predetermined target count, whose value is independent of the reference speed limit, an overspeed or underspeed condition is detected.

To generate a variable reference frequency, an input clock signal source and adjustable thumbwheel switches may be interfaced with rate multipliers to generate a reference pulse train with a pulse repetition rate proportional to the thumbwheel switch settings. A suitable count time is then determined according to the nature and type of the monitored machine. The count time is translated into a number of machine revolutions (which may be accessory shaft revolutions). The target count, that is, the number of reference pulses which will be counted over the count interval when the machine is at the reference speed, may then be calculated. It can be shown that the target count is independent of the reference speed. A counter is utilized to count the reference pulses over the prescribed count interval. A count which exceeds the target count (an overflow) will indicate that the machine speed is under the desired limit, while failure to reach the desired count will indicate that the monitored speed is overspeed. To avoid machine shutdown due to random fluctuation, the detector may be designed so that more than one consecutive under or overspeed indication is required. Either machine shutdown or other indications such as LED indication may be generated by an under or overspeed signal.

BRIEF DESCRIPTION OF THE DRAWINGS

The embodiments of the invention are illustrated by reference to the accompanying drawings wherein.

DETAILED DESCRIPTION OF THE INVENTION

Figure 1:
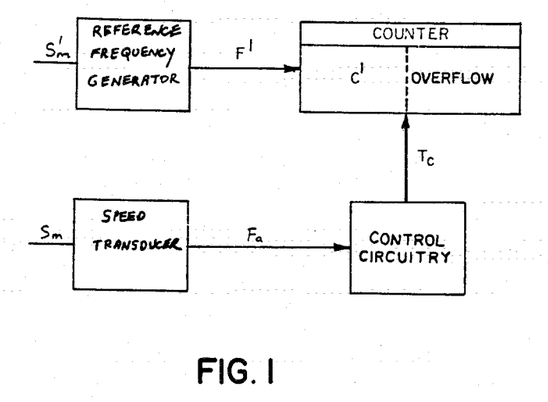
FIG. 1 is a simplified block diagram illustrating the components of the invention.

As illustrated in FIG. 1, the underspeed/overspeed detector of this invention consists essentially of a variable reference frequency generator, a speed transducer which generates a pulse train proportional to the rotational speed of a monitored shaft, a counter for digitally counting the reference pulses over a count time interval $T_c$ and a control circuit which enables and disables the counter for the count time $T_c$. $T_c$ is chosen as a fixed number of revolutions of the monitored machine.

The transducer may be any suitable device for producing an electrical pulse train whose pulse repetition rate is proportional to the rate of rotation of the rotating body. The transducer may be coupled to the shaft where rotational speed is to be measured by optical, electrical, electromagnetic or physical means. For example, the doppler transceiver discussed in Canadian Pat. No. 1,111,941, issued Nov. 3, 1981 to Saskatchewan Power Corporation, may be employed.

The counter is so designed that when an underspeed condition occurs, the reference count $C^1$ is exceeded, and an underspeed signal is generated. When the reference count $C^1$ is not reached, an overspeed signal is generated.

It will be seen from FIG. 1 that the count accumulated in the counter over the count interval $T_c$ is given by the equation $C = F^1 \times T_c$ where $F^1$ is the reference frequency or reference pulse repetition rate in pulses per second and $T_c$ is the count time in seconds. The frequency of the output signal of the variable reference frequency generator is designed to be proportional, by a multiplication factor $M_{60}$, to the reference main shaft rotational speed limit $S_m{}^1$ in revolutions per minute. The count interval $T_c$ is chosen as an integral number of main or accessory shaft revolutions. G is the gear ratio of the accessory shaft relative to the main shaft. Thus, where the main shaft speed is $S_m$, the accessory shaft speed $S_a$ is given by the equation $$S_a = G \times S_m$$

By deliberate choice $$F^1 = M \times \frac{S_m{}^1}{60}$$

and $$T_c = 60 \times \frac{N_a}{S_a}$$

where
 M = a constant multiplication factor
 $S_m{}^1$ = reference main shaft speed
 Na = the number of accessory shaft revolutions over which the count C is accumulated
 Sa = accessory shaft rotation speed [The accesory shaft from which the transducer produces an output signal. It is geared to the main shaft whose speed is to be measured.]

Thus, $$C = F^1 \times T_c = M \times Na \frac{S_m{}^1}{S_a} = \left[ \frac{MNa}{G} \right] \frac{S_m{}^1}{S_m}$$

Hence, $C = \frac{M \times Na}{G}$ if $S_m{}^1 = S_m$

It is then seen that if the target count $C^1$ is defined as the count accumulated in the counter when $S_m = S_m{}^1$ then $$C^1 = M \times Na/G$$

Thus, target count $C^1$ is a constant number for a given rotating machine which is independent of the reference speed limit $S_m{}^1$ or the measured speed $S_m$.

Figure 2:
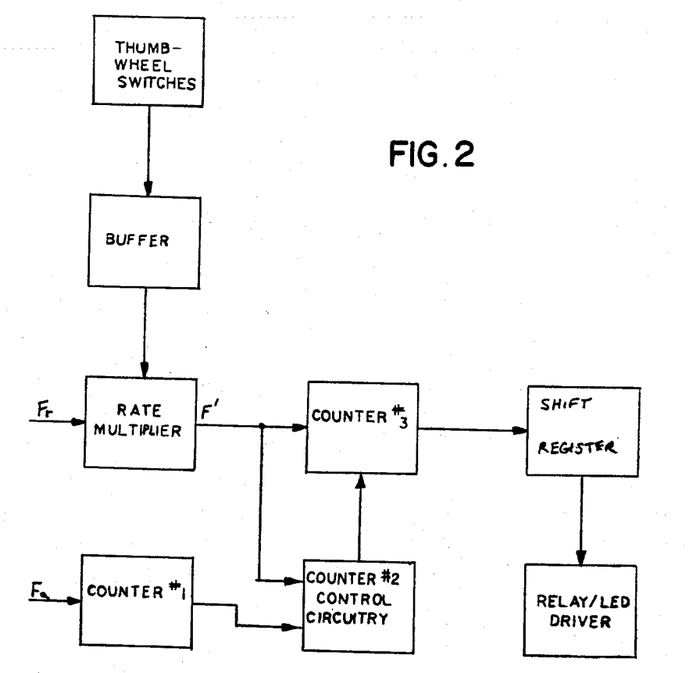
FIG. 2 is a more detailed block diagram showing the invention illustrated in FIG. 1.

As shown in FIG. 2, in order to generate a reference pulse train with a pulse repetition rate or frequency proportional to the reference speed limit, a clock of output frequency $F_r$ is employed. Thumbwheel switches are interfaced with a rate multiplier, and the clock frequency signal, in order to produce the reference frequency $F^1$. The output frequency in pulses per second of the speed transducer, $F_a$ is divided by counter 1 to obtain a pulse train whose time period between pulses is the desired count interval, designed as $T_c$. Counter 3 is then enabled and disabled by control circuit counter 2 to count the number of reference pulses generated over the control interval. In order to accurately account for lost reference pulses during various transitional stages, control circuit counter 2 counts reference pulse train $F^1$. The output of counter 2 drives counter 3 which counts the number of pulses of reference train $F^1$ when enabled by counter 2. Overspeed or underspeed signals are stored in the shift register, whose output drives a relay or LED.

Figure 3:
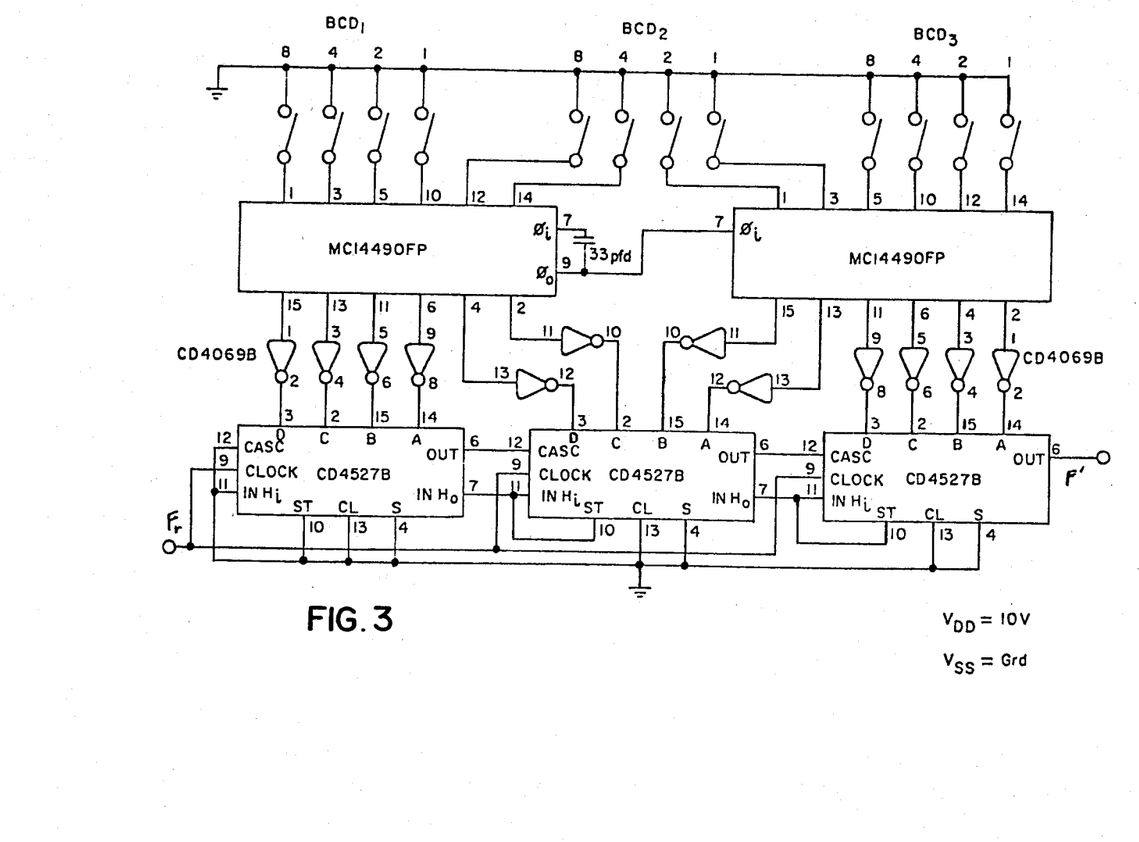
FIG. 3 is a schematic circuit diagram of the rate multiplier illustrated in FIG. 2.

FIG. 3 illustrates the rate multiplier circuit utilized in the preferred embodiment. In this embodiment, a resolution factor of 100 is used. That is, the reference speed limit is fixed within ±100 rpm, with three significant digits. Three adjustable thumbwheel switches are interfaced to three CD4527B "BCD Rate Multipliers" manufactured by RCA utilizing two MC14490FP "Hex Contact Bounce Eliminators" made by Motorola and two RCA CD4069B "Hex Inverters". By wiring the three BCD rate multipliers in the add mode, it is possible to obtain an output frequency $F^1$ given by $F^1 = (0.1\ BCD_1 + 0.01\ BCD_2 + 0.001\ BCD_3) F_r$ where $F_r$ is the clock frequency, chosen here as 100 KHz. $BCD_1$, $BCD_2$ and $BCD_3$ are the pulse repetition rates output from the three RCA CD4527B circuits. In this embodiment the output frequency $F^1$ is numerically equal to the number set on the three thumbwheel switches times 100. Thus setting the three switches at 223 gives an output frequency $F^1$ of 22,300 Hz. It can be seen that the value for the multiplication factor M using this configuration is equal to 60 because $F^1$ and $Sm^1$ are chosen to be equal. The output signal $F^1$ is then used to increment counter 3.

As previously indicated, the selection of the appropriate count time interval $T_c$ is important to insure that the detector will respond sufficiently quickly to avoid machine damage. In the preferred embodiment, which is utilized to detect overspeed of the turbine of a natural gas compressor unit, which unit is designed to run at 22,300 rpm, a count interval of one second is chosen. In this embodiment, the accessory shaft is monitored, with an accessory to main shaft speed ratio G of 0.18834. It can then be seen, that a count interval of one second will be approximately equal to a number of accessory shaft revolutions $N_a$ equal to 70. However, a shorter count interval will not reduce the safety factor. Accordingly, in the preferred embodiment it was found convenient to use a value for $N_a$ of 10 and sample four consecutive counts before indicating over or underspeed.

Figure 4:
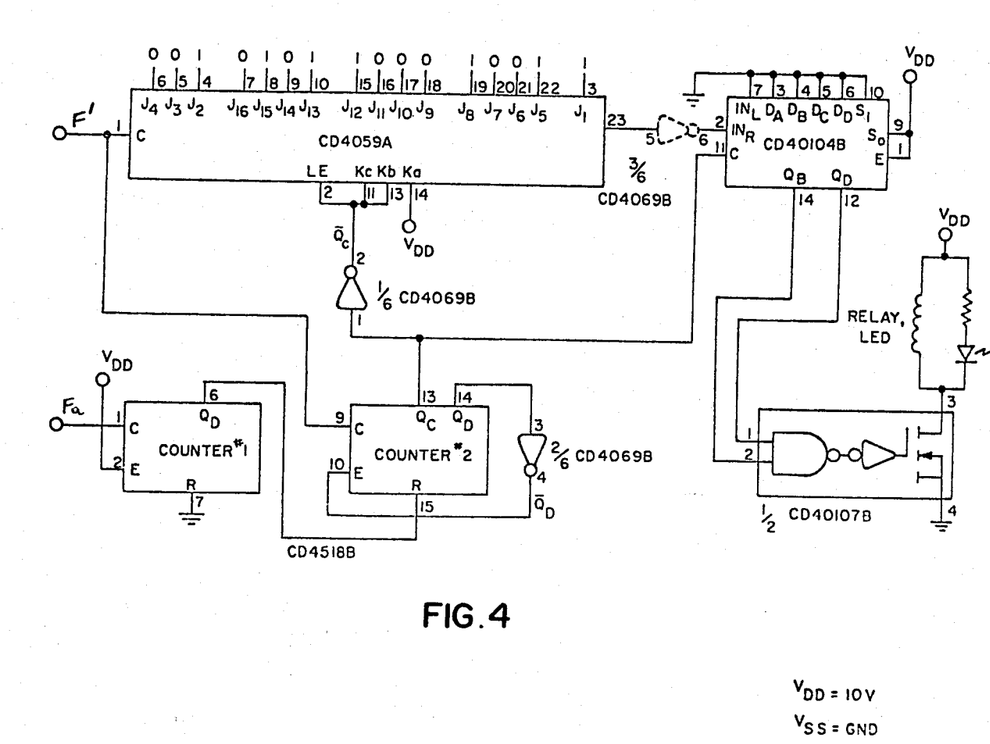
FIG. 4 is a schematic circuit diagram of the digital control circuitry and counter shown in FIG. 2.

FIG. 4 illustrates the counter circuitry utilized in the preferred embodiment. The transducer output from the accessory shaft $F_a$ is divided by 10 in counter 1 to generate the count interval, $T_c$. One section of a RCA CD4518B "Dual BCD Up Counter" is used to perform the division by 10.

Figure 5:
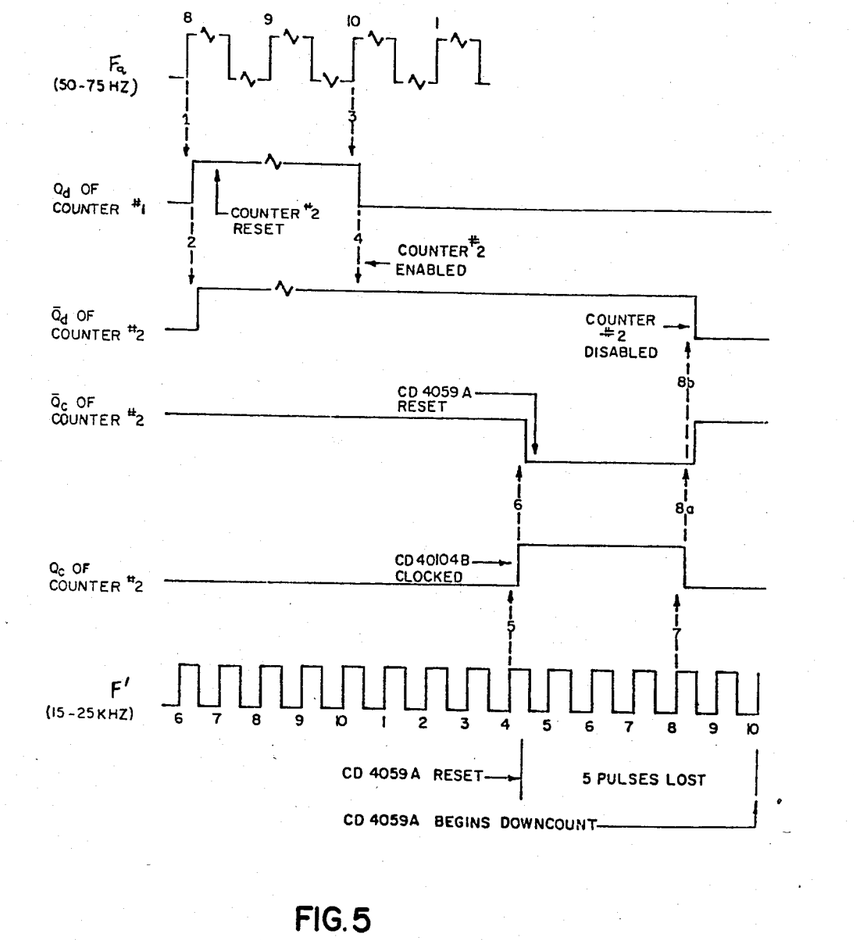
FIG. 5 is a timing chart showing the relative timing of the various pulse trains as they occur in the circuitry of FIG. 4.

A CD4059A "Programmable Divide-By-N Counter" is utilized as counter 3. Such a counter is further described in the RCA 1977 CMOS Data Book and can be programmed to divide the input frequency $F^1$ by any number N from 3 to 15,999. The output signal of Counter 3 is a pulse one clock-cycle wide occurring at a rate equal to the input frequency divided by N if the latch enable (LE) is set at a logical '0', however if the latch enable is set at a logical '1' the counter output will remain high once an output pulse occurs and remain high until the latch enable is returned to a logical '0'. The down-count is preset by means of the sixteen jam inputs J1 through J16. Utilizing the values M=60, $N_a$=10 and G=0.18834, it is seen that in this embodiment $C^1$ equals 3184. As will be discussed subsequently, five clock pulses are lost during the count and reset sequence of counter 3. Accordingly, in this embodiment the down-counter is programmed to down-count from 3179. In order to reset the counter in accordance with the jam inputs, inputs $K_b$ and $K_c$ must be held low, (i.e. at logic "0") for at least three full clock pulses. The counter will then begin to count when a different mode is selected by raising $K_b$ and $K_c$ to logic 1. An additional clock pulse is lost in the transition between the counting and non-counting modes. In order to maintain the K inputs at logic "0" for the required three clock cycles, control circuit counter 2 is utilized. In the preferred embodiment, counter 2 is the second section of the RCA CD4518B device along with two sections of a CD4069B "Hex Inverter". As shown in FIG. 5, $Q_d$ of counter 1 is raised to the HI level for a duration of two accessory shaft revolutions, every ten revolutions. During that interval, counter 2 is reset and enabled. Thus counter 2 begins incrementing at a rate determined by reference frequency $F^1$ once every ten accessory shaft pulses. $Q_c$ of counter 2 is held HI for incremented reference pulses four through eight. The signal from $Q_c$ is inverted by inverter RCA 1/6CD4069B so that outputs Kc and Kb are held low for the four clock cycles. On the eighth clock pulse, $Q_c$ drops to logical "0", the inversion of $Q_c$ is logical "1" and counter 3 commences counting after a further transition period of one pulse. It can be seen that a total of five pulses have been lost since the reset of the CD4059A counter by dropping the K inputs to 0. Counter number two is self-disabled by connecting output $Q_d$ to input E (enable) via an inverter 2/6CD4069B.

Counter 3 then proceeds to downcount from the pre-programmed target count until reset by counter 2 ten accessory shaft revolutions later. If the target count is reached before resetting, an output signal is generated at pin 23 of the CD4059A. In the case of an underspeed detector, such a signal indicates underspeed and will be stored as such without inversion in shift register CD40104B. Output $Q_c$ of counter number two is used to trigger the shift register so that the output at pin 23 is stored just prior to resetting of counter number three. In the case of an overspeed, the count will not be reached within the count interval and no signal (i.e. logical "0") will be present at pin 23. An invertor 3/6CD4069B is then included to convert this signal to a logical "1". Thus, overspeed condition may be indicated using essentially the same circuit design.

In the preferred embodiment, a CD40104b "4-Bit Universal Bidirectional Shift Register" is wired to the output of counter 3. Four consecutive samples, each of ten accessory shaft revolutions, are stored in the shift register. The second and fourth outputs of the shift register are wired to an AND gate, so that overspeed or underspeed indication will be provided if the first and third of four consecutive samples indicate overspeed or underspeed as the case may be. In the preferred embodiment, the $Q_b$ and $Q_d$ outputs of the shift register are connected into one section of a CD40107B "Dual 2-Input NAND Buffer/Driver". If both inputs are driven HI, the appropriate relay circuit is turned on, as well as an LED to indicate whether the overspeed or underspeed relay has been activated. For additional detail, please see FIG. 4, the timing diagrams of which are illustrated in FIG. 5.

While various circuit configurations using known circuit components are possible to achieve these results, it will be seen that the invention allows adjustability of the reference speed limit merely by variation of the reference frequency, as by adjusting thumbwheel switches or the like. The target count as programmed into the counter is a constant independent of the desired reference speed limit, depending only on machine parameters. Other configurations of counters, and overspeed/underspeed indication means may readily occur to those skilled in the art.

It should also be noted that, in practice, separate overspeed and underspeed circuits are employed, each being set to a particular reference speed. Aside from the appropriate setting of the reference speed, the only difference between the two circuits is that the overspeed circuit includes an inverter between circuits CD4059A and shift register CD40104B.

I claim:

1. A device for detecting overspeed or underspeed condition in a rotating body, comprising:
   (a) a source of a first train of electrical pulses whose pulse repetition rate is proportional to the rotational speed of said rotating body;
   (b) signal-generating means for producing a second pulse train whose pulse repetition rate is directly proportional to a predetermined overspeed or underspeed limit; and
   (c) digital comparison means responsive to said first and second pulse trains adapted to compare the number of pulses in said second pulse train occurring during an interval determined by a fixed number of pulses of said first puse train to a predetermined value independent of said predetermined overspeed or underspeed limit and to produce an output signal when said number of pulses of said second pulse train in said interval exceeds said predetermined value.

2. The device of claim 1 wherein said source is a transducer responsive to the angular velocity of said rotating body.

3. The device of claim 1 wherein said signal-generating means comprises clock means.

4. The device of claim 1 further comprising means for varying said pulse repetition rate of said second pulse train.

5. The device of claim 4 wherein said means for varying said pulse repetition rate comprises a rate multiplier.

6. The device of claim 1 wherein said digital comparison means comprises a down counter, programmable to count the number of pulses in said second pulse train over said interval and to generate a signal when said count exceeds said predetermined value.

7. The device of claim 1 further comprising shift register means connected to the output of said digital comparison means for storing and sampling said output signal.

8. A device for determining whether the rotational speed of a revolving article exceeds or is less than a predetermined speed, comprising:
   (a) transducer means coupled to said revolving article for generating a train of electrical pulses, the pulse repetition rate of said electrical pulse train being proportional to the speed of rotation of said revolving article;
   (b) clock means for producing a reference electrical pulse train having a pulse repetition rate which is directly proportional to said predetermined speed;
   (c) counting means connected to the output of said transducer means and to the output of said clock means for counting the number of clock pulses occurring during a period of time equal to an integral number of revolutions of said article; and
   (d) digital comparison means for generating a logical 1 output if the number of clock pulses counted by said counting means exceeds a predetermined value and for generating a logical 0 output if the number of clock pulses counted by said counting means is less than or equal to said predetermined value, which predetermined value is dependent upon the parameters of the revolving article whose speed is being monitored but not dependent upon the overspeed or underspeed limit.

9. A device for comparing the rotational speed of a revolving article with a variable reference value for the rotational speed of the article, comprising:
   (a) transducer means coupled to said revolving article for producing a train of electrical pulses, the pulse repetition rate of said train being proportional to the rotational speed of said article;
   (b) clock means for generating a pulse train having a known pulse repetition rate;
   (c) input means for receiving a variable reference value;
   (d) rate multiplication means connected to the output of said clock means and said input means for generating a reference pulse train whose pulse repetition rate is directly proportional to said variable reference value;
   (e) a programmable counting and frequency division circuit, programmed to divide the number of pulses counted by a fixed predetermined number, clocked by said reference pulse train for counting the number of pulses of said reference pulse train during a period of time equal to an integral number of revolutions of said revolving article, and for dividing the number of reference pulses so counted by said fixed predetermined number, the output of said counting and frequency division circuit being a logical 1 if the number of pulses counted during the counting period exceeded said fixed predetermined number and, otherwise, the output of said counting of frequency division circuit being a logical 0.

10. A device, as recited in claim 8, further comprising:
    (a) shift register means connected to the output of said comparison means for storing the output value of the comparison means.

11. An electrical circuit for comparing the rotational speed of a rotating article with a predetermined value, comprising:
    (a) input means for receiving a first input pulse train having a pulse repetition rate proportional to the rate of rotation of said article;
    (b) a reference signal generator for producing a pulse train having an adjustable pulse repetition rate directly proportional to said predetermined value;
    (c) a counter clocked by said reference signal generator and gated by said input means for counting the total number of reference pulses during a time period equal to an integral number of revolutions of said article; and
    (d) means for dividing the output count of said counter by a predetermined fixed value and for generating a logical 1 if said count exceeds said predetermined fixed value, and, otherwise, for generating a logical 0.

12. A detector of overspeed or underspeed condition in a rotating body, comprising:
    (a) A source of a first train of electrical pulses whose pulse repetition rate is proportional to the rotational speed of said rotating body;
    (b) Signal-generating means for producing a second pulse train having a variable pulse repetition rate which is directly proportional to a predetermined overspeed or underspeed limit; and (c) Programmable counting means for counting the number of pulses in said second pulse train occurring during an interval determined by an integral number of pulses of said first pulse train and to produce an output signal when said counted number of pulses of said second pulse train exceeds a predetermined digital value which is a function of the parameters of said body and said counting means but is independent of said overspeed or underspeed limit.

* * * * *

UNITED STATES PATENT AND TRADEMARK OFFICE
CERTIFICATE OF CORRECTION

PATENT NO. : 4521894
DATED : September 26, 1985
INVENTOR(S) : Richard Peter Moffat It is certified that error appears in the above-identified patent and that said Letters Patent is hereby corrected as shown below:

Column 6, line 43, change "CD40104b" to --CD40104B--.

Signed and Sealed this

Twenty-fourth Day of December 1985

[SEAL]

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,521,894
DATED : June 4, 1985
INVENTOR(S) : Richard Peter Moffat

It is certified that error appears in the above-identified patent and that said Letters Patent is hereby corrected as shown below:

Column 7, line 24, delete "puse" and insert --pulse--.

Signed and Sealed this

First Day of April 1986

[SEAL]

Attest:

DONALD J. QUIGG

Attesting Officer

Commissioner of Patents and Trademarks